United States Patent [19]
Tankersley

[11] Patent Number: 5,516,086
[45] Date of Patent: May 14, 1996

[54] WORKPIECE HOLDING METHOD AND APPARATUS

[76] Inventor: James E. Tankersley, Laser-Tronics Machining & Engraving; 1413 Linda Vista Dr., San Marcos, Calif. 92069

[21] Appl. No.: 358,187

[22] Filed: Dec. 16, 1994

[51] Int. Cl.$^6$ .................................................. B23Q 1/25
[52] U.S. Cl. ........................ 269/69; 269/48.1; 269/309
[58] Field of Search .................................. 29/35.5, 33 J; 269/311, 312, 71, 48.1, 69, 91, 99, 100, 309

[56] References Cited

U.S. PATENT DOCUMENTS

| | | | |
|---|---|---|---|
| 3,030,903 | 4/1962 | Morris | 269/48.1 |
| 3,807,034 | 4/1974 | Pevzner et al. | 269/309 |
| 4,059,036 | 11/1977 | Hartley | 269/48.1 |
| 4,828,240 | 5/1989 | Longenecker et al. | 269/100 |
| 4,872,792 | 10/1989 | McCubbin | 269/69 |
| 5,074,536 | 12/1991 | McConkey | 269/48.1 |

OTHER PUBLICATIONS

Ad of Mid–State Machine Product appearing on p. 53 of the Jul. 1994 issue of "Metifax" magazine.
"Flexible Pallet Workholding System" appearing on pp. 70, 72 and 73 of Jun. 1994 issue of Man Modern Application News magazine.

*Primary Examiner*—Bruce M. Kisliuk
*Assistant Examiner*—Thomas W. Lynch
*Attorney, Agent, or Firm*—Loyal M. Hanson

[57] ABSTRACT

A quick-change method for holding a workpiece on a worktable includes the step of providing at least one tombstone module (a workpiece support structure) for holding the workpiece, and a receiver assembly for removably holding the tombstone module on the worktable. The method proceeds by mounting the receiver assembly on the worktable, mounting the workpiece on the tombstone module, and removably mounting the tombstone module on the receiver assembly. In line with the above, an apparatus for holding a workpiece on a worktable (a modular tombstone assembly) includes at least one tombstone module for holding the workpiece, and a receiver assembly for removably holding the tombstone module on the worktable. The receiver assembly includes a base for mounting the receiver assembly on the worktable and an expandable mechanism extending from the base (an expandable mandrel, spindle, axle, pin, bar, shaft, or other elongated member for placement within a bore of the modular tombstone) for holding the tombstone module. The tombstone module includes a block of material with a bore shaped and dimensioned to fit over the expandable mechanism so that expanding the mechanism removably secures the tombstone module to the receiver assembly and thereby to the worktable.

12 Claims, 4 Drawing Sheets

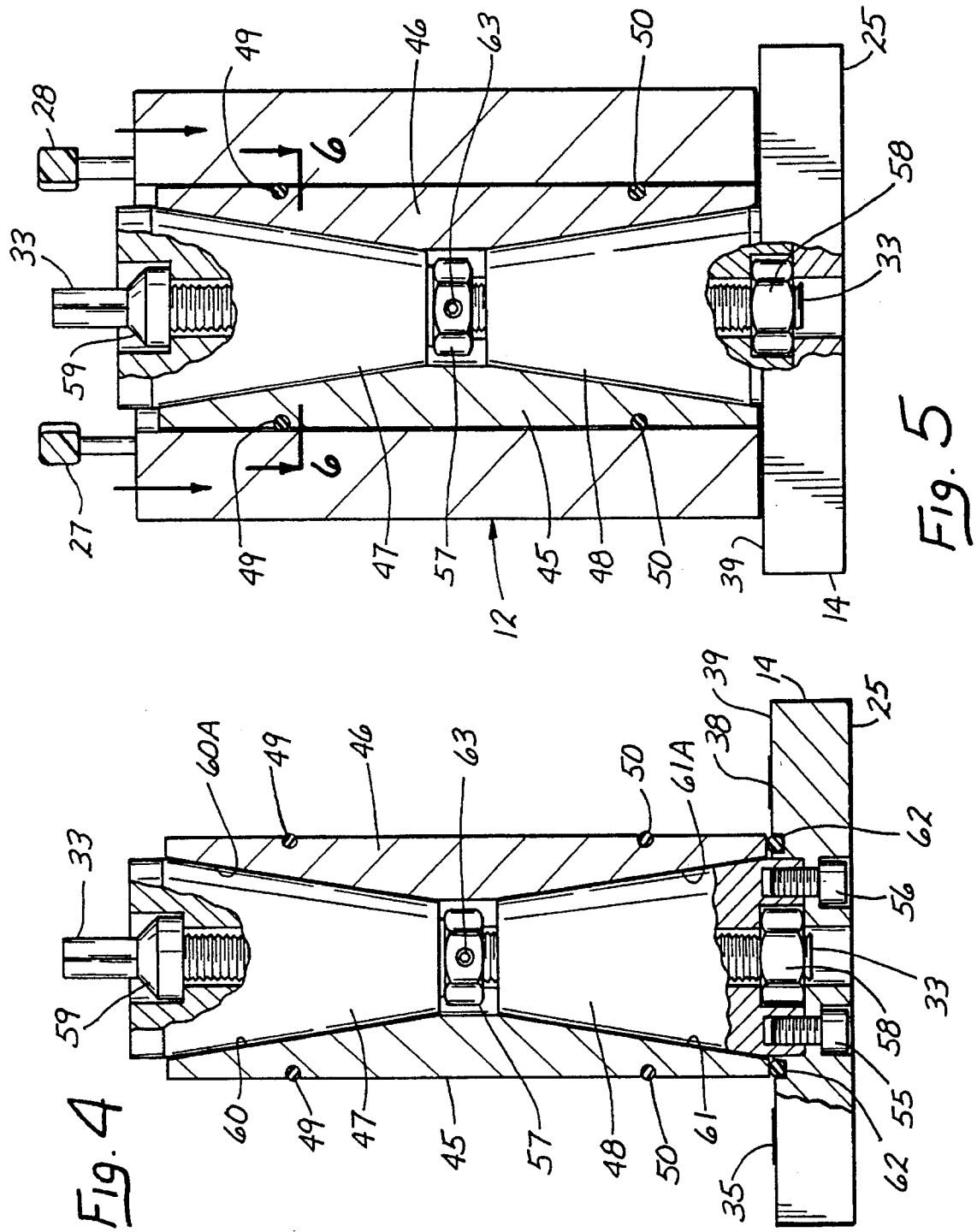

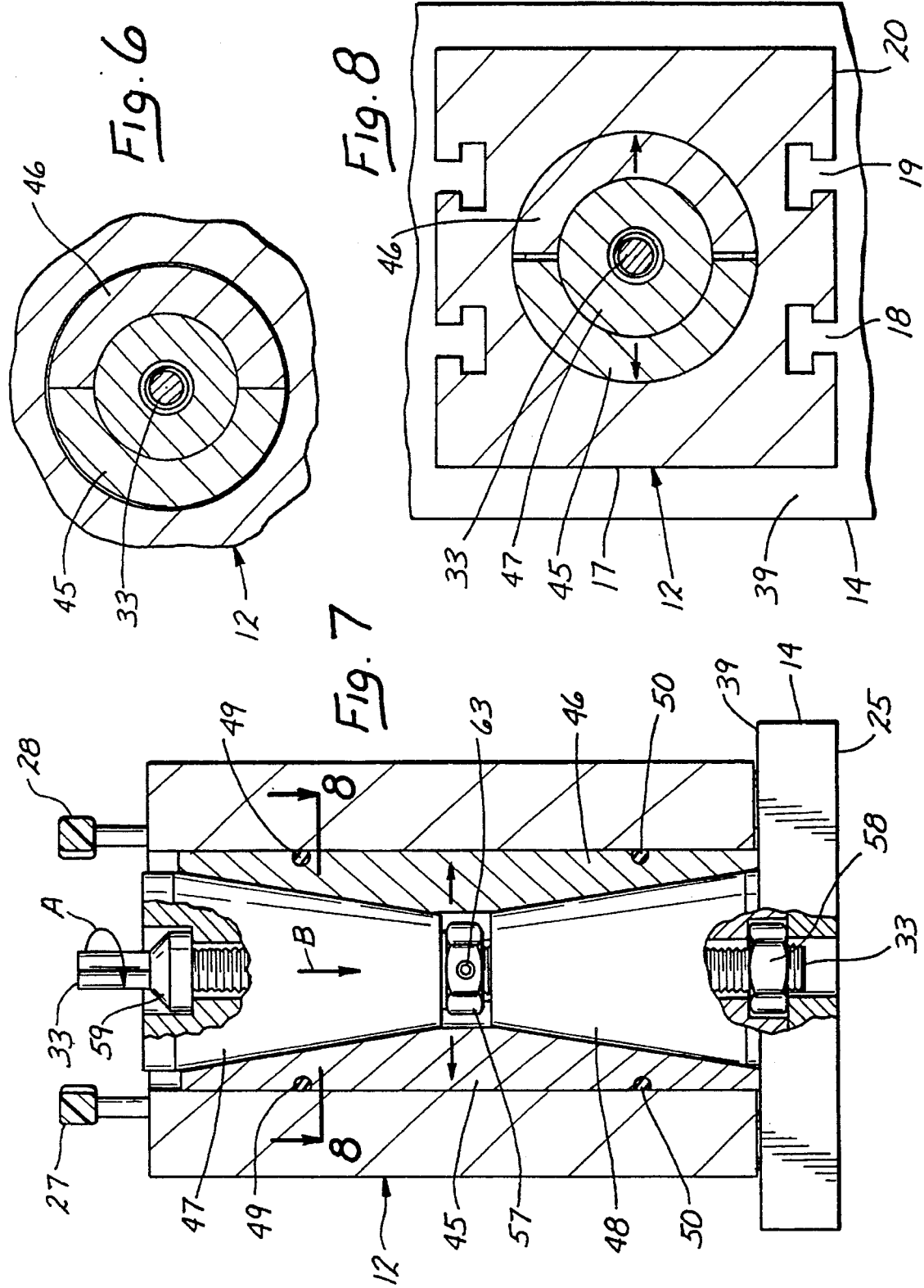

5,516,086

WORKPIECE HOLDING METHOD AND APPARATUS

BACKGROUND OF THE INVENTION

1. Technical Field

This invention relates generally to tooling fixtures, and more particularly to a method and apparatus for holding a workpiece on a machining center worktable.

2. Description of Related Art

Recall that manufacturers often use a computerized machining center to machine a workpiece. In order to hold the workpiece on the machining center worktable, they use a special support structure that is commonly called a "tombstone." It takes the form of a one-piece metal structure that bolts securely to the worktable to provide a sturdy upwardly extending support structure. The workpiece mounts securely on a flat or slotted vertical surface of the tombstone and that arrangement enables machining with high positional accuracy and repeatability.

However, tombstone tooling and setup time can be significant and even approach a full work day for some jobs. That leaves the costly machining center idle for unacceptably long periods of time. Frequent job changeovers aggravate the problem and so machinists need a better technique for supporting the workpiece on the worktable.

SUMMARY OF THE INVENTION

This invention solves the problem outlined above by providing a quick-change method and modular tombstone assembly for holding the workpiece. The modular tombstone assembly includes a receiver assembly that bolts or otherwise suitably mounts on the worktable. It also includes one or more tombstone modules that removably mount quickly and conveniently on the receiver assembly. Once the receiver assembly is in place on the worktable with a first tombstone module on it, the machinist can tool and setup other tombstone modules for quick exchange when desired with minimum machining center down time.

To paraphrase the claim language subsequently presented, a method of holding a workpiece on a worktable includes the steps of (1) providing at least one workpiece support structure for holding the workpiece (i.e., a tombstone module), and (2) providing a receiver assembly for removably holding the tombstone module on the worktable. The method proceeds by mounting the receiver assembly on the worktable, mounting the workpiece on the tombstone module, and removably mounting the tombstone module on the receiver assembly.

Preferably, additional tombstone modules are included to enable rapid interchange of workpieces. In addition, the receiver assembly preferably includes an expandable mechanism (e.g., an expandable mandrel, spindle, axle, pin, bar, shaft, or other elongated member for placement within a bore of the tombstone module). The expandable mechanism extends along an axis aligned with the axis of the bore so that radially expanding the mechanism holds the tombstone module securely in place.

In line with the above, an apparatus for holding a workpiece on a worktable includes at least one tombstone module for holding the workpiece, and a receiver assembly for removably holding the tombstone module on the worktable. The receiver assembly includes a base for mounting the receiver assembly on the worktable and an expandable mechanism extending from the base for holding the tombstone module in place. The tombstone module includes a block of material with a bore shaped and dimensioned to fit over the expandable mechanism so that expanding the mechanism secures the tombstone module to the receiver assembly and thereby to the worktable.

Thus, the invention overcomes the setup and job-change inefficiencies of existing one-piece tombstones and workholding techniques while maintaining high positional accuracy and repeatability. The following illustrative drawings and detailed description make the foregoing and other objects, features, and advantages of the invention more apparent.

BRIEF DESCRIPTION OF THE DRAWINGS

FIG. 4 is an elevation view of the receiver assembly with portions in cross section;

FIG. 5 is an elevation view similar to FIG. 4 showing the tombstone module in place on the receiver assembly;

FIG. 6 is a cross sectional view taken on line 6—6 of FIG. 5 showing the expandable mandrel in an unexpanded configuration;

FIG. 7 is an elevation view similar to FIG. 5 showing operation of the receiver assembly to expand the mandrel; and FIG. 8 is a cross sectional view taken on line 8—8 of FIG. 7 showing the radially outward holding action of the mandrel as it expands.

DESCRIPTION OF THE PREFERRED EMBODIMENTS

Figure 1:
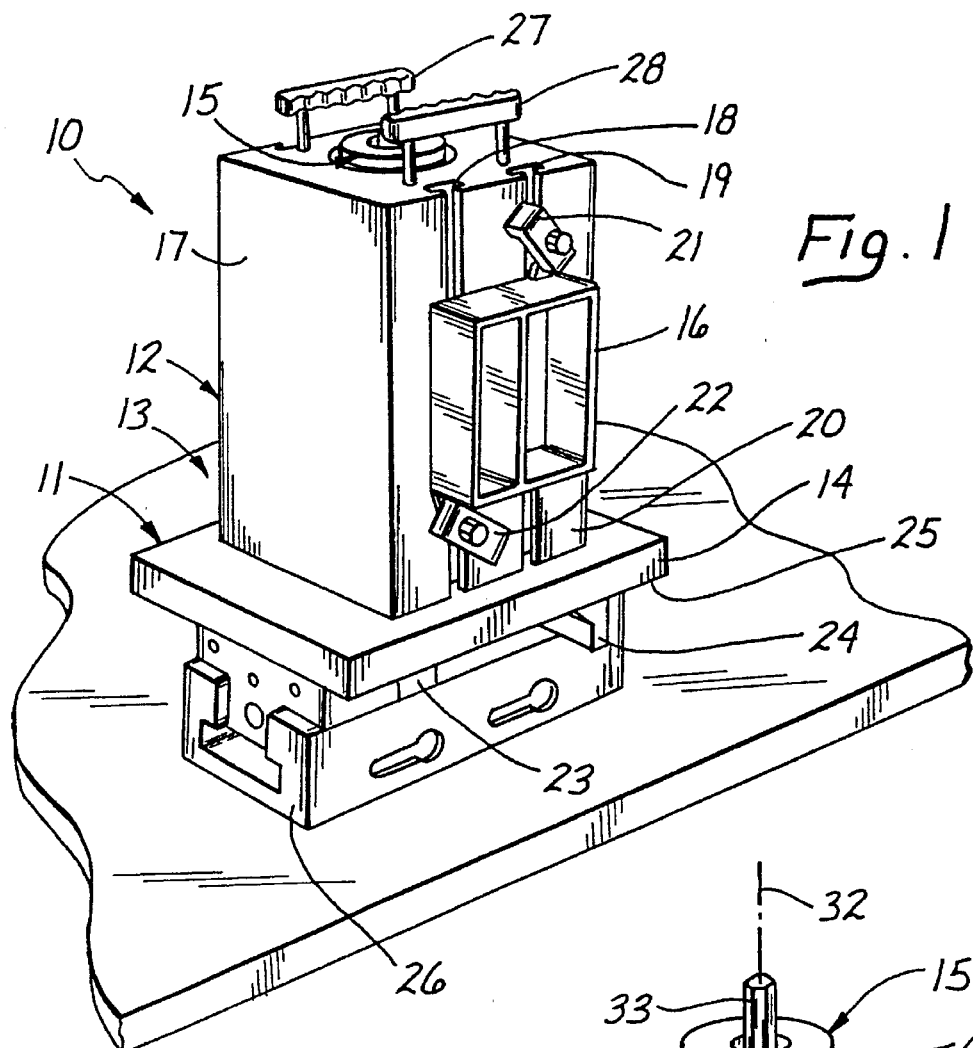
FIG. 1 of the drawings is a three-dimensional view of a modular tombstone assembly constructed according to the invention shown vise-mounted on a machining center worktable.

The drawings show an apparatus 10 (a modular tombstone assembly) constructed according to the invention. Generally, it includes a receiver assembly 11 and a tombstone module 12 (i.e., a workpiece support structure). Those components are configured as subsequently described so that the receiver assembly 11 mounts removably on the worktable 13 of a machining center, and the tombstone module 12 mounts removably on the receiver assembly 11. That arrangement enables efficient setup and job-change procedures that result in far less machining center down time.

The machining center operates to machine the workpiece. It may take any of various known forms, including a machining center with a horizontal spindle that drills holes horizontally under computer control. Machining centers are well known to machinists and others familiar with machining and so a machining center is not illustrated in the drawings other than to depict the worktable 13 (e.g., a metal support with a horizontal work surface).

The illustrated receiver assembly 11 includes an aluminum base 14 and a expandable mechanism 15 extending vertically from the base 14. The expandable mechanism 15 fits into the tombstone module 12. The user places the tombstone module 12 over the expandable mechanism 15 and then expands the mechanism 15 to hold the tombstone module 12 securely in position on the receiver assembly 11 and thereby on the worktable 13.

As an idea of size and construction, the base 14 of the receiver assembly 11 measures about 10 inches wide by about 13½ inches long and 1½" thick. The expandable mechanism 15 is made from steel components and elastomeric O-rings. It measures about 4.5 inches in diameter and it extends vertically from the base 14 about 13 inches. Of course, those dimensions and materials may vary significantly without departing from the inventive concepts disclosed.

Before mounting the tombstone module 12 on the receiver assembly 11, the user mounts a workpiece 16 on the tombstone module 12 and he mounts the receiver assembly 11 on the worktable 13. The workpiece 16 (e.g., a chassis to be drilled) may be mounted by suitable means, including bolting it directly to a flat vertical surface 17 of the tombstone module 12. As shown in FIG. 1, however, the workpiece 16 is mounted in T-slots 18 and 19 of a slotted vertical surface 20 of the tombstone module 12 using clamps 21 and 22.

The base 14 of the receiver assembly 11 may be bolted or clamped directly to the worktable or it may be mounted by other suitable means. The base 14 of the apparatus 10 illustrated in FIG. 1 is vise-mounted by means of first and second flanges 23 and 24 that extend downwardly form the underside 25 of the base 14. The flanges 23 and 24 mount on the base 14 by suitable means (e.g., machine screws or bolts that screw into the base 14) and they are gripped by the jaws of a conventional vise 26 that is bolted to the worktable 13. That mounts the receiver assembly 11 securely on the worktable 13 to help maintain positional accuracy and repeatability despite quick-change operations.

With the workpiece 16 and the receiver assembly 11 mounted, the user grasps handles 27 and 28 on the tombstone module 12. Next, he places the tombstone module 12 over the expandable mechanism 15 and expands the mechanism 15 to hold the tombstone module 12 in place. Then, while the machining center is machining the workpiece 16, the user may setup another job on a different tombstone module (not shown) for quick interchange.

To interchange jobs, the user loosens the expandable mechanism 15, grasps the handles 27 and 28, lilts and removes the tombstone module 12, and mounts a different tombstone module on the receiver assembly 11. Alternately, the user may mount another workpiece on the surface 17 of the tombstone module 12. In that case, he looses the expandable mechanism 15, rotates the tombstone module 12 ninety degrees to position the other workpiece for machining, and then retightens the mechanism 15.

Figure 2:
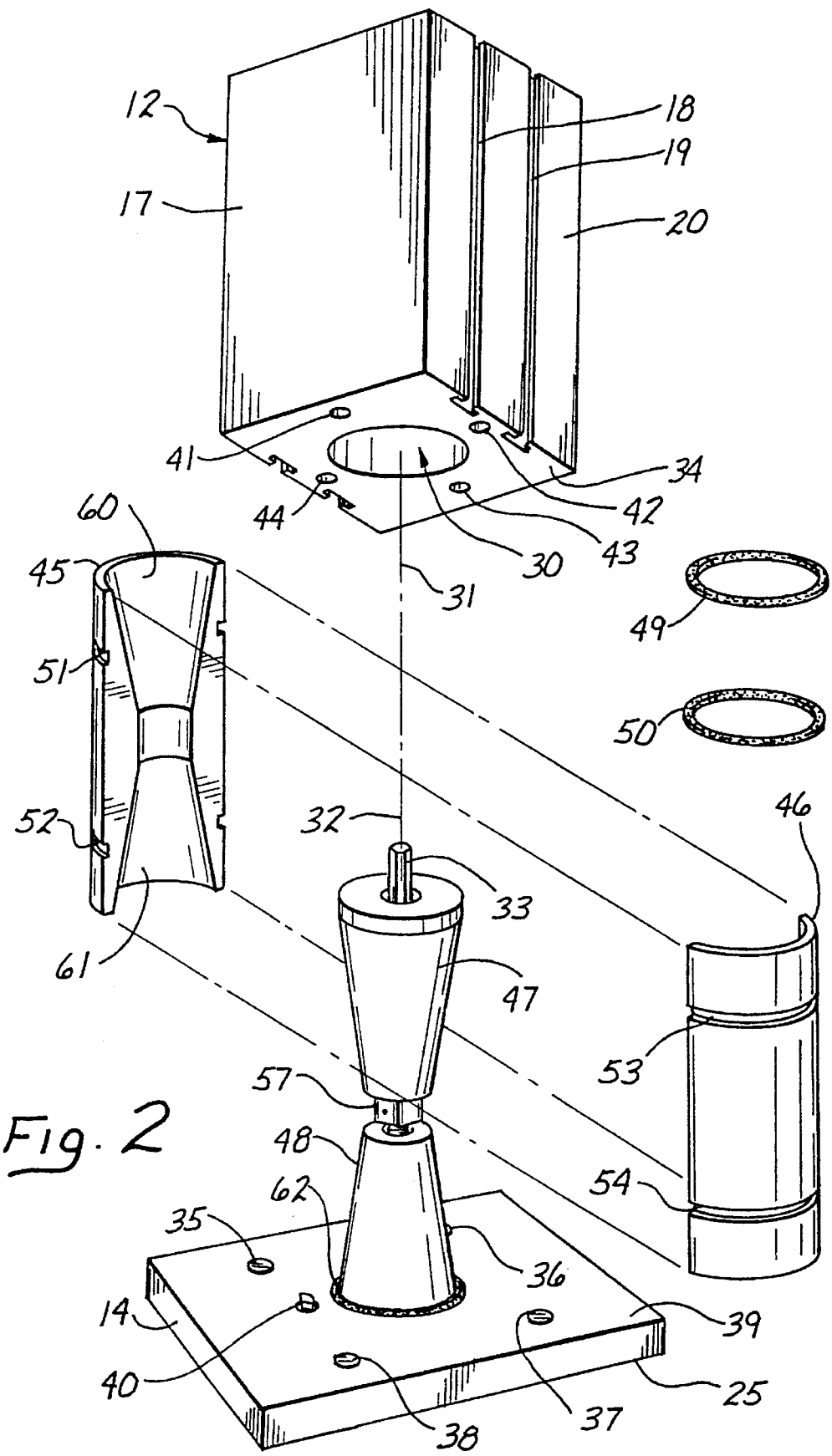
FIG. 2 is an enlarged three-dimensional view showing the tombstone module (i.e., the workpiece support structure) removed from the receiver assembly and the receiver assembly partially disassembled.

FIG. 2 shows the apparatus 10 with the tombstone module 12 removed from the receiver assembly 11 and the receiver assembly 11 partially disassembled. The illustrated tombstone module 12 is a block of aluminum alloy measuring about 8 inches square and 12 inches high. A circular bore 30 measuring 4.5 inches in diameter extends through the block of aluminum along a centrally disposed bore axis 31.

To place the tombstone module 12 on the receiver assembly 11, the user aligns a bore axis 31 (FIG. 2) with a centrally disposed axis 32 (FIGS. 2 and 3) extending through a threaded shaft 33 of the receiver assembly 11. Then, the user lowers the tombstone module 12 until an undersurface 34 (FIG. 2) of the tombstone module 12 rests atop alignment pads 35–38 (FIGS. 2–4) on the base 14 of the receiver assembly 11. The pads 35–38 may be formed as part of the base 14 or they may be separate components that are screwed onto or otherwise suitably mounted on the base 14. They extend slightly above an uppersurface 39 of the base 14 where they abut the undersurface 34 of the tombstone module 12 to precisely align the tombstone module 12 relative to the uppersurface 39 in a direction along the axis 32, thereby helping to maintain positional accuracy and repeatability of machining operations.

As the user positions the tombstone module 12 on the receiver assembly 11 that way, he rotates the tombstone module 12 relative to the axis 32 to a position such that a pin 40 (FIGS. 2 and 3) extends into one of four alignment holes 41–44 (FIG. 2) in the tombstone module 12. The holes 41–44 are disposed radially about the bore axis 31, and they may be at ninety-degree intervals as shown in FIG. 2. The pin 40 has a diamond-shaped cross section and it extends into one of the holes 41–44 to align the tombstone module circumferentially relative to the axis 32 in a selected position. Preferably, bushings (not shown) composed of a suitable steel alloy are included within the holes 41–44 to maintain dimensional integrity and thereby help maintain positional accuracy and repeatability of machinizing operations. Of course, fewer or more than four holes may be used without departing from the inventive concepts disclosed.

Figure 3:
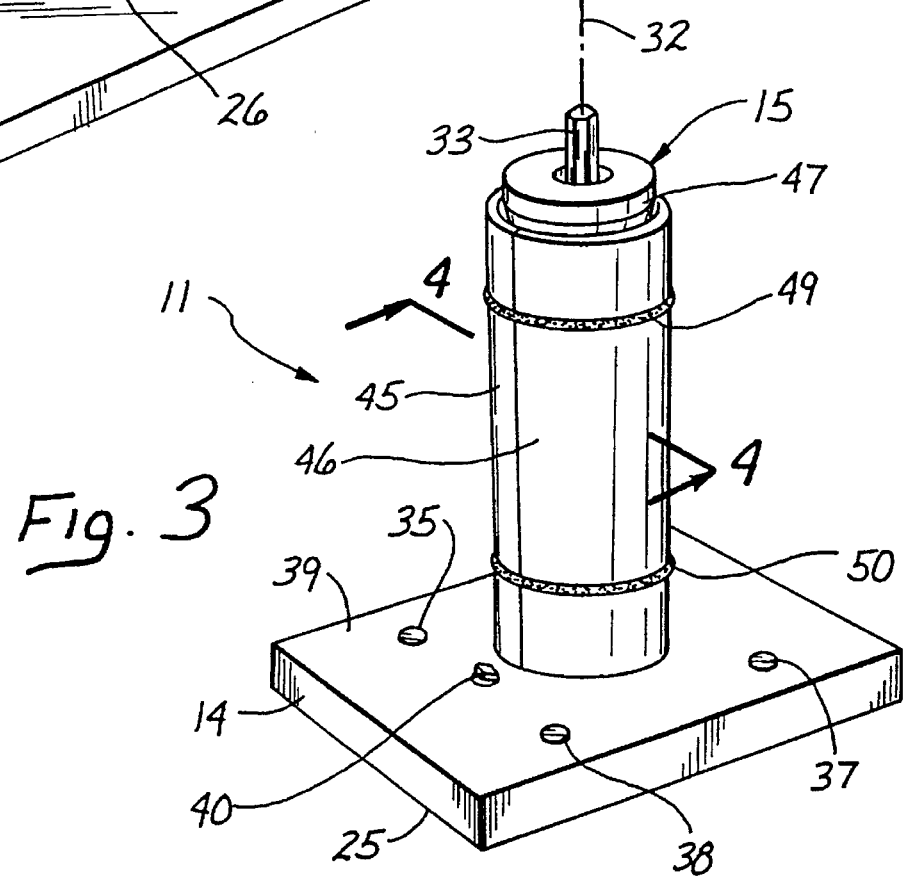
FIG. 3 is a three-dimensional view of just the receiver assembly portion of the modular tombstone assembly.

The illustrated expandable mechanism 15 (FIGS. 1 and 3) includes two similar aluminum-alloy cylindrical segments 45 and 46 (each one-half of a cylinder) that are held together over expansion cones 47 and 48 by O-rings 49 and 50 (FIG. 2). The O-rings 49 and 50 are composed of a suitable known elastomeric material. They seat within annular grooves 51 and 52 in the cylindrical segment 45 and annular grooves 53 and 54 in the cylindrical segment 46 as shown in FIGS. 2 and 3. That holds the cylindrical segments 45 and 46 together in the cylindrical configuration shown in FIG. 3 having a diameter slightly less than the diameter of the bore 30 so that the user can easily place the tombstone module 12 on the receiver assembly 11 in the position shown in FIGS. 1 and 5–8, with the cylindrical segments 45 and 46 of the expandable mechanism 15 within the bore 30.

Bolts 55 and 56 (FIG. 4) extend through the base 14 and into the lower expansion cone 48 to secure the lower expansion cone 48 to the base 14. The threaded shaft 33 extends through the upper expansion cone 47, a nut 57, and the lower expansion cone 48 to a nut 58 (FIGS. 4, 5, and 7). A flange 59 on the threaded shaft 33 (FIGS. 4, 5, and 7) bears against the upper expansion cone 47 as the nut 58 bears against the lower expansion cone 48 so that turning the threaded shaft 33 clockwise as depicted by an arrow A in FIG. 7 (with a wrench, for example) forces the expansion cones 47 and 48 toward each other axially along the axis 32 as depicted by an arrow B in FIG. 7.

That causes the upper expansion 47 cone to bear radially against an inwardly facing conical surface 60 on the cylindrical segment 45 (FIGS. 2 and 4) and a similar surface 60A on the cylindrical segment 46 (FIG. 4). Similarly, it causes the lower expansion cone 48 to bear radially against an inwardly facing surface 61 on the cylindrical segment 45 (FIGS. 2 and 4) and a similar surface 61A on the cylindrical segment 46 (FIG. 4). As a result, the cylindrical segments 45 and 46 bear radially against the tombstone module 12 as depicted by the two oppositely directed arrows in FIGS. 7 and the two oppositely directed arrows in FIG. 8, and that holds the tombstone module 12 securely in place. In other words, turning the threaded shaft 33 clockwise moves the expansion mechanism 15 from an unexpanded configuration that allows the tombstone module 12 to be moved (shown in cross section in FIG. 6) to an expanded configuration that holds the tombstone module 12 securely in place (shown in cross section in FIG. 8).

In bearing against the conical surfaces 60 and 61 of the cylindrical segment 45 and the conical surfaces 60A and 61A of the cylindrical segment 46, the axially movable upper expansion cone 47 and axially movable lower expansion core 48 bears both radially and axially against the cylindrical segments 45 and 46. The resulting axially downward component of force in the direction of the arrow B in FIG. 7 and the two arrows in FIG. 5 forces the cylindrical segments 47 and 48 toward the base 14 slightly, against an elastomeric O-ring 62 that is more clearly visible in FIGS. 2 and 4. That in turn, forces the tombstone module 12 securely against the alignment pads 35–38 because the radial component of force results in significant frictional force between the cylindrical segments 45 and 46 and the tombstone module 12. For those purposes, the illustrated O-ring 62 has a suitable diameter to hold the cylindrical segments about 0.030 inch above the uppersurface 39 of the base 14 in the unexpanded configuration.

To loosen the expandable mechanism 15, the user rotates the shaft 33 counterclockwise. A setscrew 63 in the nut 57 secures the nut 57 to the shaft 33. As a result, counterclockwise movement of the shaft 33 causes the nut 57 to bear against the upper expansion cone 47 and break it loose from the cylindrical segments 45 and 46 as the shaft 33 moves axially out of the nut 58. When that is done, the cylindrical segments 45 and 46 no longer bear against the tombstone module 12 so that the user can easily remove or reposition the tombstone module 12.

Thus, the invention provides a quick-change method and modular tombstone assembly for holding the workpiece. Once the receiver assembly is in place on the worktable with a first tombstone module on it, the machinist can tool and setup other tombstone modules for quick exchange when desired with minimum machining center down time. The invention achieves far better setup and job-change efficiencies compared to existing one-piece tombstones and workholding techniques while maintaining positional accuracy and repeatability. Although an exemplary embodiment has been shown and described, one of ordinary skill in the art may make many changes, modifications, and substitutions without necessarily departing from the spirit and scope of the invention.

What is claimed is:

1. An apparatus for holding a workpiece on a worktable, comprising:

means in the form of at least one workpiece support structure for holding the workpiece; and means in the form of a receiver assembly for removably holding the workpiece support structure on the worktable;

the receiver assembly including means in the form of a base for mounting the receiver assembly on the worktable and means in the form of an expandable mechanism extending from the base for holding the workpiece support structure; and the workpiece support structure including a block of material with a bore shaped and dimensioned to fit over the expandable mechanism so that expanding the mechanism secures the workpiece support structure to the receiver assembly and thereby to the worktable.

2. An apparatus as recited in claim 1, wherein:

the expandable mechanism extends from the base along an axis; and the base includes means in the form of at least one pad for aligning the position of the workpiece support structure axially along the axis.

3. An apparatus as recited in claim 2, wherein the base includes four pads spaced radially about the axis at ninety-degree intervals.

4. An apparatus as recited in claim 2, wherein the expandable mechanism is so arranged that expanding the mechanism forces the mechanism radially outwardly against the workpiece support structure and then axially slightly toward the base in order to thereby force the workpiece support structure against the pad.

5. An apparatus as recited in claim 1, wherein the expandable mechanism includes:

a cylinder split into at least two cylinder segments; and a dual-cone expansion arrangement for expanding the cylinder segments radially from an unexpanded position having a diameter slightly less than the diameter of the bore in the workpiece support structure.

6. An apparatus as recited in claim 5, wherein the expandable mechanism includes means in the form of a threaded shaft for operating the dual-cone expansion arrangement.

7. An apparatus as recited in claim 1, wherein:

the expandable mechanism extends from the base along an axis; and the receiver assembly includes means in the form of a diamond-shaped pin extending from the base parallel to the longitudinal axis for cooperating with at least one hole in the workpiece support structure in order to align the position of the workpiece support structure radially relative to the axis.

8. An apparatus as recited in claim 7, wherein the workpiece support structure includes holes spaced radially about the axis of the bore to enable alignment of the workpiece support structure in a selected one of multiple positions spaced radially about the axis.

9. An apparatus as recited in claim 8, wherein the holes are spaced radially about the axis of the bore at ninety-degree intervals to enable alignment of the workpiece support structure in a selected one of four positions spaced radially about the axis at ninety-degree intervals.

10. An apparatus as recited in claim 1, wherein the receiver assembly includes means in the form of at least one flange mounted on the base of the receiver assembly for enabling a user to mount the base on the worktable with a vise.

11. An apparatus as recited in claim 1, wherein the workpiece support structure includes handles for facilitating manual replacement of the workpiece support structure.

12. An apparatus as recited in claim 1, wherein the workpiece support structure includes T-slots for facilitating mounting of the workpiece.

\* \* \* \* \*